(12) United States Patent
Pree et al.

(10) Patent No.: US 12,202,647 B2
(45) Date of Patent: Jan. 21, 2025

(54) BUNG PLUG SEAL

(71) Applicant: PROTECHNA S.A., Fribourg (CH)

(72) Inventors: Karl-Heinz Pree, Etzbach (DE); Bernd Klatt, Ruppach-Goldhausen (DE)

(73) Assignee: PROTECHNA S.A., Fribourg (CH)

( * ) Notice: Subject to any disclaimer, the term of this patent is extended or adjusted under 35 U.S.C. 154(b) by 0 days.

(21) Appl. No.: 18/039,127

(22) PCT Filed: Nov. 4, 2021

(86) PCT No.: PCT/EP2021/080648
§ 371 (c)(1),
(2) Date: May 26, 2023

(87) PCT Pub. No.: WO2022/111970
PCT Pub. Date: Jun. 2, 2022

(65) Prior Publication Data
US 2024/0182209 A1  Jun. 6, 2024

(30) Foreign Application Priority Data

Nov. 30, 2020 (DE) .............. 10 2020 131 713.1

(51) Int. Cl.
*B65D 39/08* (2006.01)
*B65D 51/16* (2006.01)

(52) U.S. Cl.
CPC ........ *B65D 39/088* (2013.01); *B65D 51/1611* (2013.01)

(58) Field of Classification Search
CPC .... B65D 11/08; B65D 25/005; B65D 39/082; B65D 39/088; B65D 39/0088;
(Continued)

(56) References Cited

U.S. PATENT DOCUMENTS

| 336,766 | A | | 2/1886 | Taylor | |
|---|---|---|---|---|---|
| 3,289,878 | A | * | 12/1966 | Davenport | B65D 51/1644 220/203.19 |
| 3,700,359 | A | * | 10/1972 | Vanderjagt | F01L 23/00 417/404 |
| 2002/0000451 | A1 | * | 1/2002 | Hansen | B67D 7/0294 222/464.2 |

(Continued)

FOREIGN PATENT DOCUMENTS

| CL | 199601173 | 4/1997 |
|---|---|---|
| CL | 200002302 | 1/2002 |

(Continued)

OTHER PUBLICATIONS

Japanese Office Action for corresponding Japanese Patent Application No. 2023-530275, issued Apr. 10, 2024. (English translation).

(Continued)

*Primary Examiner* — Robert J Hicks
(74) *Attorney, Agent, or Firm* — Quarles & Brady LLP

(57) ABSTRACT

A bung plug seal for bung containers, the bung plug seal having a bung plug for being disposed in a bung socket of the bung container, the bung plug having a plug depression for inserting a fitting tool, the plug depression having a depression bottom provided with at least one ventilation opening, and the bung plug being provided with a ventilation plug which is disposed in the plug depression and a thread bolt of which is accommodated in an internal thread of a receiving hole formed in the depression bottom and which has a lid disk provided with a handling unit and connected to the thread bolt for sealing the ventilation opening in a closed position of the ventilation plug.

11 Claims, 7 Drawing Sheets

(58) Field of Classification Search
CPC .............. B65D 41/04; B65D 41/0407; B65D 41/0435; B65D 51/1644; B65D 2205/00
USPC .......... 217/98, 106, 110; 220/304, 303, 288, 220/295, 601, 661
See application file for complete search history.

(56) References Cited

U.S. PATENT DOCUMENTS

2020/0391908 A1* 12/2020 Klatt .................... B65D 39/086
2023/0303312 A1* 9/2023 Christiansen ...... B65D 51/1644

FOREIGN PATENT DOCUMENTS

| CL | 200402646 | | 8/2005 |
| CN | 109654107 A | | 4/2019 |
| DE | 102018103137 B3 | | 11/2018 |
| FR | 419319 A | | 1/1911 |
| RU | 2404907 C1 | | 11/2010 |
| RU | 2689218 C1 | | 5/2019 |
| WO | WO-9402376 A1 | * | 2/1994 ............. B65D 39/08 |
| WO | 2019158283 A1 | | 8/2019 |

OTHER PUBLICATIONS

PCT International Search Report and Written Opinion, PCT/EP2021/080648, Feb. 22, 2022, 15 pages.
National Institute of Industrial Property—INAPI—Chile, Expert Report, Application No. 202301387, Jul. 31, 2024, 11 pages [English Language Translation Only].
National Institute of Industrial Property—Argentina, Office Action, Application No. 20210103191, Mar. 12, 2024, 6 pages.

* cited by examiner

BUNG PLUG SEAL

This application represents the national stage entry of PCT International Patent Application No. PCT/EP2021/080648 filed on Nov. 4, 2021 and claims priority to German Patent Application No. 10 2020 121 713.1 filed on Nov. 30, 2020. The contents of each of these applications are hereby incorporated by reference as if set forth in their entirety herein.

The disclosure relates to a bung plug seal for bung containers, the bung plug seal having a bung plug for being disposed in a bung socket of the bung container, the bung plug having a plug depression for inserting a fitting tool.

Bung plug seals of the make mentioned above are used both on bung containers formed as a barrel and on bung containers formed as inner containers for intermediate bulk containers (IBC). Depending on the nature of the liquid accommodated in the bung container, the bung plugs have a closed depression bottom or a depression bottom having a gas exchange mechanism, which allows ventilating and de-airing a container interior in order to perform a pressure compensation with the surrounding area of the container, if necessary.

Irrespective of the specific embodiment of the depression bottom of the bung sockets, the bung plugs are removed from a filling opening, which is typically disposed on an upper surface of the container, for emptying the bung container in order to allow a sufficient ventilation of the container interior for withdrawing the liquid accommodated in the container by means of a removal unit, which is typically formed on a side of the container.

In practice, the bung plug which is connected to the bung socket via a screw connection is unscrewed from the bung socket using a fitting tool inserted into the plug depression of the bung plug, such that the whole opening cross section of the bung socket is available for ventilating the container interior.

Aside from the fact that carrying out the known ventilation measure requires the fitting tool, which must be kept ready to use accordingly, the interengaging threads of the bung socket and the bung plug and the seal inserted between the bung socket and the bung plug will wear, in particular in the case of multiple withdrawals of partial quantities of the liquid accommodated in the bung container. Furthermore, there is a risk of foreign objects entering the container interior because of the large opening cross section of the bung socket. The complete removal of the bung plug from the bung socket also necessitates suitable safekeeping of the bung plug for the duration of the withdrawal of the liquid from the bung container in order to be able to screw the bung plug back into the bung socket after the liquid withdrawal.

These foregoing explanations illustrate that the practice of ventilating a bung container during the liquid withdrawal used up to now entails a significant amount of effort and that carrying out the container ventilation requires appropriate care.

Therefore, the object of the present disclosure is to propose a bung plug seal which significantly facilitates carrying out the ventilation of the container necessary for withdrawing the liquid from the bung container.

This object is attained by the bung plug seal according to the disclosure having the features of claim 1.

The plug depression of the plug seal according to the disclosure has a depression bottom provided with at least one ventilation opening and the bung plug is provided with a ventilation plug which is disposed in the plug depression and which has a thread bolt accommodated in an internal thread of a receiving hole formed in the depression bottom and which has a lid disk provided with a handling unit and connected to the thread bolt for sealing the ventilation opening in a closed position of the ventilation plug.

The ventilation plug, which is formed in the bung plug according to the disclosure, allows a ventilation of the inner container without the bung plug having to be removed from the bung socket by means of the fitting tool. Instead, it is sufficient for ventilating the container interior of the bung container to unscrew the ventilation plug from the receiving hole to such an extent that the lid disk covering the ventilation opening which is formed in the depression bottom in a closed position of the ventilation plug is lifted off the depression bottom. In this case, air can access the container interior via a ventilation gap formed between a circumferential edge of the lid disk and an inner wall of the plug depression or via openings formed in the lid disk which do not overlap with the ventilation opening formed in the depression bottom.

The handling unit formed on the lid disk allows an actuation of the ventilation plug, meaning both an unscrewing of the thread bolt of the ventilation plug from the receiving hole formed in the depression bottom and a screwing of the ventilation plug into the receiving hole without having to use a tool. Since just a lifting of the lid disk from the depression bottom is sufficient to allow a ventilation of the container interior, as explained above, the ventilation plug can remain captively connected to the bung plug even in its ventilation position.

Preferably, the thread bolt has a spring member for being supported against a wall surface of the receiving hole or the receiving hole has a spring member for being supported against a wall surface of the thread bolt, in such a manner that a preload force is effective between the thread bolt and the receiving hole.

Because of the spring member formed on the thread bolt of the ventilation plug or on the receiving hole in the depression bottom, a defined axial positioning of the ventilation plug in the depression bottom can be achieved via the frictional engagement formed between the thread bolt and the receiving hole by means of the spring member without a sufficient self-locking having to be established in the thread engagement. It is thus possible to form the thread of the thread bolt or the internal thread of the receiving hole very steeply in order to transfer the ventilation plug from its closed position to the maximum open position, in which a maximum distance is formed between the depression bottom and the lid disk, by means of a minimum number of rotations. Additionally, the axial positioning between the thread of the thread bolt and the internal thread of the receiving hole, which is a friction-locked positioning because of the spring member, prevents that an open position of the ventilation plug chosen by the operator is affected by external influences, such as vibrations of the container, which could cause the ventilation plug to move to its closed position because of gravity. Just as the open position of the ventilation plug, the closed position of the ventilation plug is also defined by the frictional engagement caused by the spring member.

In an advantageous embodiment, the spring member is formed on a wall surface of the thread bolt or the receiving hole, said wall surface being formed by a thread surface, such that the spring member can be designed so as to be integrated in the thread bolt or the receiving hole.

If the spring member has at least one spring tab which is formed on the thread bolt and which has a tab head radially protruding a thread core of the thread bolt, the spring member can be manufactured together with the thread bolt in a joint manufacturing step.

If the spring member has a plurality of spring tabs whose tab heads are disposed in a shared horizontal plane of the thread bolt, a radial frictionally engaged support of the thread bolt in the receiving hole can be achieved, said support being distributed over the circumference of the thread bolt.

Preferably, the spring tabs are disposed at a lower end of the thread bolt, such that the thread engagement between the bolt thread and the inner thread of the receiving hole is not affected.

With a view to an ideally short embodiment of the thread bolt or the receiving hole, it is especially advantageous if the spring member is formed on a thread section of the thread bolt or of the internal thread of the receiving hole. The spring member thus forms a component of the thread and therefore has a dual function.

Particularly preferably, the spring member has at least one spring tab formed on a thread section, said spring tab having a radial thread protrusion formed on the thread section, such that the thread core serves to form the elastically resilient tab part and the thread itself serves to form a tab head protruding radially from the thread core.

Especially advantageously, a continuous transition between the tab head and the adjoining thread section is formed as a result of this, such that the tab head affects the thread function as little as possible.

Preferably, the lid disk has a locking member which interacts with a counter-locking member disposed in the plug depression in such a manner that the axial relative movement of the lid disk in the plug depression is limited by the depression bottom on one side and by the counter-locking member on the other side, such that a maximum open position of the ventilation plug is defined by means of the counter-locking member.

Preferably, the counter-locking member has counter-locking elements which are disposed on an inner wall of the plug depression and which are formed so as to interlock with an annular locking protrusion which is formed on an engagement member of a sealing cap which is inserted into the plug depression.

Such an embodiment allows counter-locking elements which may be formed on the inner wall of the plug depression anyway in order to interlock with a sealing cap, which makes accessing the plug depression tamper-proof, to also be used for defining the maximum open position of the ventilation plug.

In a particular embodiment of the bung plug seal, in which the bung plug has a gas exchange mechanism formed on the depression bottom for ventilating and de-airing a container interior of the bung container, the thread bolt disposed in the receiving hole has a passage hole which serves as a gas exchange hole for forming the gas exchange opening, such that the ventilation plug forms an integral component of the gas exchange mechanism.

Hereinafter, a preferred embodiment of the disclosure will be described in more detail with reference to the drawings.

Figure 1:
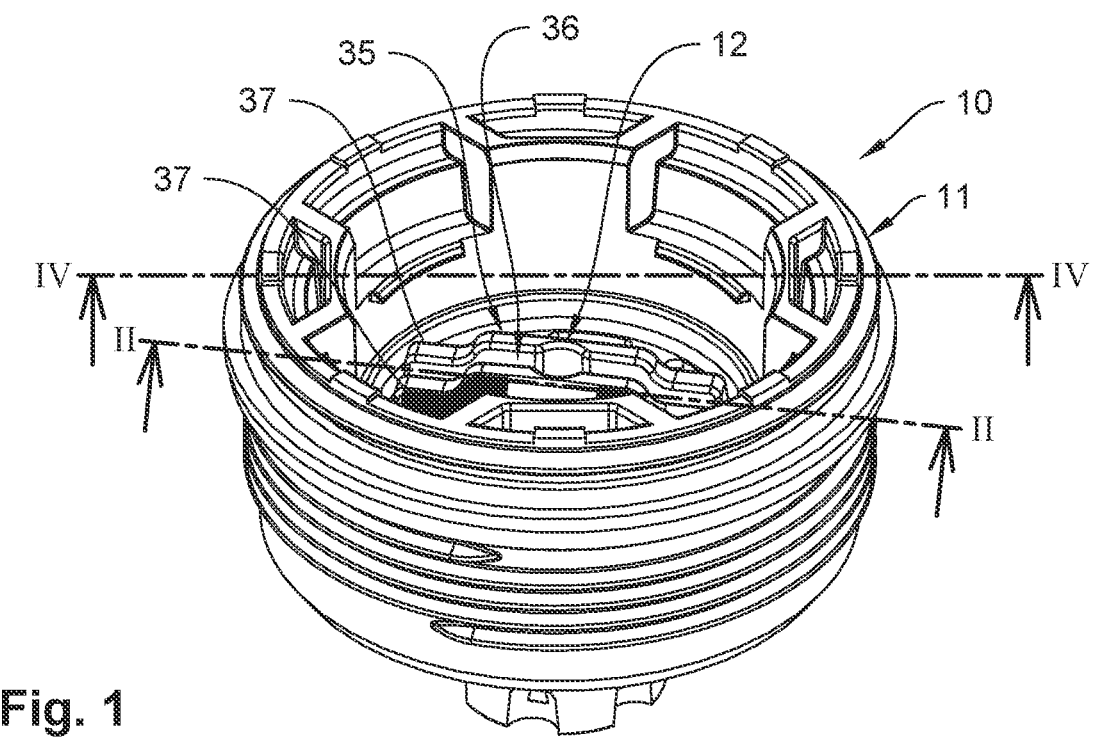
FIG. 1 is an isometric view of a bung plug seal with a ventilation plug disposed in a bung plug.
Figure 2:
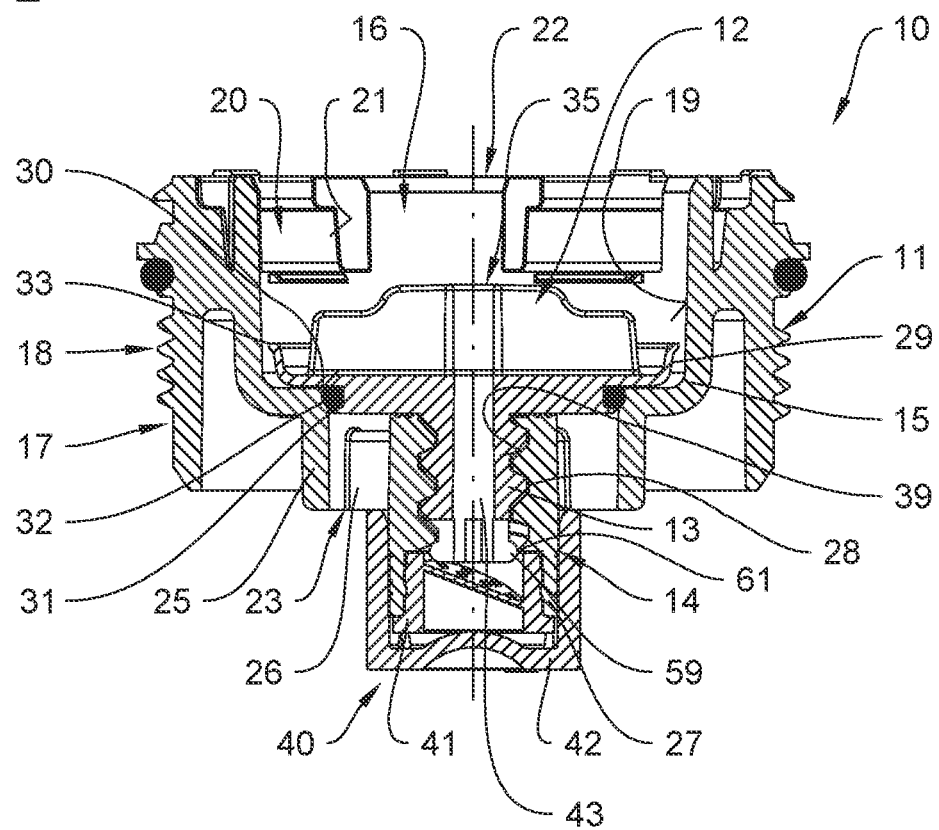
FIG. 2 is a sectional view according to cutting line II-II of the bung plug seal illustrated in FIG. 1 with the ventilation plug disposed in the closed position.

FIG. 1 shows a bung plug seal 10 in a first embodiment having a ventilation plug 12 which is disposed in a bung plug 11 and a thread bolt 13 of which is inserted into a receiving hole 14, as in particular FIG. 2 shows, said receiving hole 14 being located in a depression bottom 15 of a plug depression 16 formed in bung plug 11.

On its circumferential wall 17, bung plug 11 is provided with a plug thread 18 by means of which bung plug 11 can be screwed into a bung socket (not further illustrated) which is disposed on a bung container, which is in particular formed as a bung barrel. Furthermore, it is possible to screw bung plug 11 into a bung socket formed in a screw lid, the screw lid serving to seal a filling opening, which is enlarged compared to the bung socket, on an intermediate bulk container (IBC).

Plug depression 16 formed in bung plug 11 serves to insert a tool by means of which bung plug 11 can be screwed into or out of the respective bung socket. Wall recesses 20 are formed in an inner wall 19 of plug depression 16 for the engagement of the tool in such a manner that drivers (not further illustrated) formed on the tool can engage in wall recesses 20 in order to transmit a torque between the drivers and stop surfaces 21 of stop bodies 22 formed by wall recesses 20 in inner wall 19.

Figure 4:
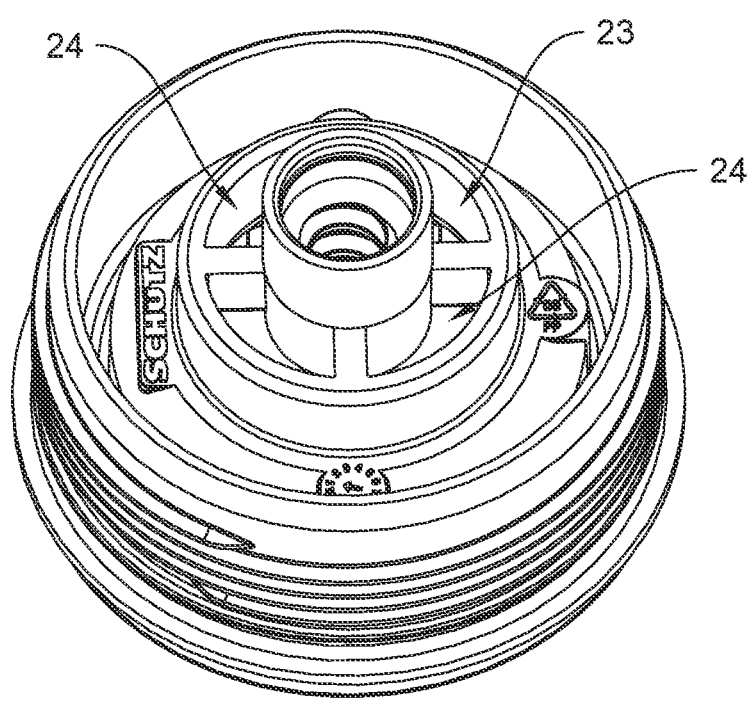
FIG. 4 is a bottom view of the bung plug illustrated in FIG. 1.

As further shown in FIG. 2, depression bottom 15 is provided with a ventilation opening 23 in addition to receiving hole 14, said ventilation opening 23 in this case (as is also shown in FIG. 4) having four opening segments 24 which are formed by a cylindrical edge web 25 formed on depression bottom 15 being connected to a sleeve-shaped hub 27 of depression bottom 15 via radial connecting webs 26 disposed in a spoke-like manner, said hub 27 forming receiving hole 14 which is provided with an internal thread 39 which serves to form a thread engagement with an external thread 28 of the thread bolt 13 formed on ventilation plug 12.

Figure 6:
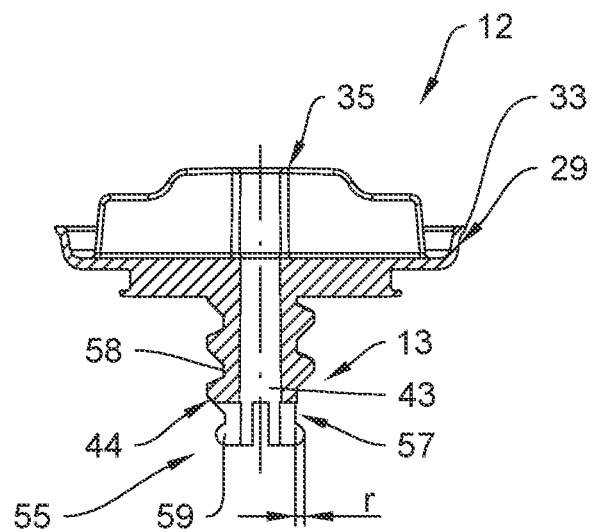
FIG. 6 is a sectional view of the ventilation plug of the embodiments of the bung plug seal illustrated in FIGS. 1 to 3.

As in particular FIG. 6 shows, ventilation plug 12 has a lid disk 29 which is connected to thread bolt 13 and which serves to seal ventilation opening 23 in the closed position of ventilation plug 12 illustrated in FIG. 2. In the closed position, lid disk 29 abuts against depression bottom 15, a seal 32 being disposed in a circumferential groove 31 formed on a lower surface of lid disk 29 for sealing the space between an opening edge 30 of ventilation opening 23 and lid disk 29.

Lid disk 29 has a circumferential edge which is formed as a locking member 33 and which (as becomes clear when comparing FIG. 2 with FIG. 3, in which ventilation plug 12 is shown in an open position) defines a maximum open position of ventilation plug 12 by locking member 33 abutting against counter-locking elements 34 disposed in the area of wall recesses 20 on inner wall 19 of plug depression 16. Since counter-locking elements 34 limit the maximum opening position of ventilation plug 12, in which thread bolt 13 of ventilation plug 12 is still engaged with the internal thread of receiving hole 14, ventilation plug 12 is clearly defined in its maximum opening position and is captively connected to bung plug 11.

During a fitting of ventilation plug 12 in plug depression 16 of bung plug 11, thread bolt 13 is screwed into receiving hole 14, counter-locking elements 34 which are formed on inner wall 19 of plug depression 16 being surmountable because of an elastic deformation of locking member 33 during the process of screwing in said thread bolt 13.

Figure 3:
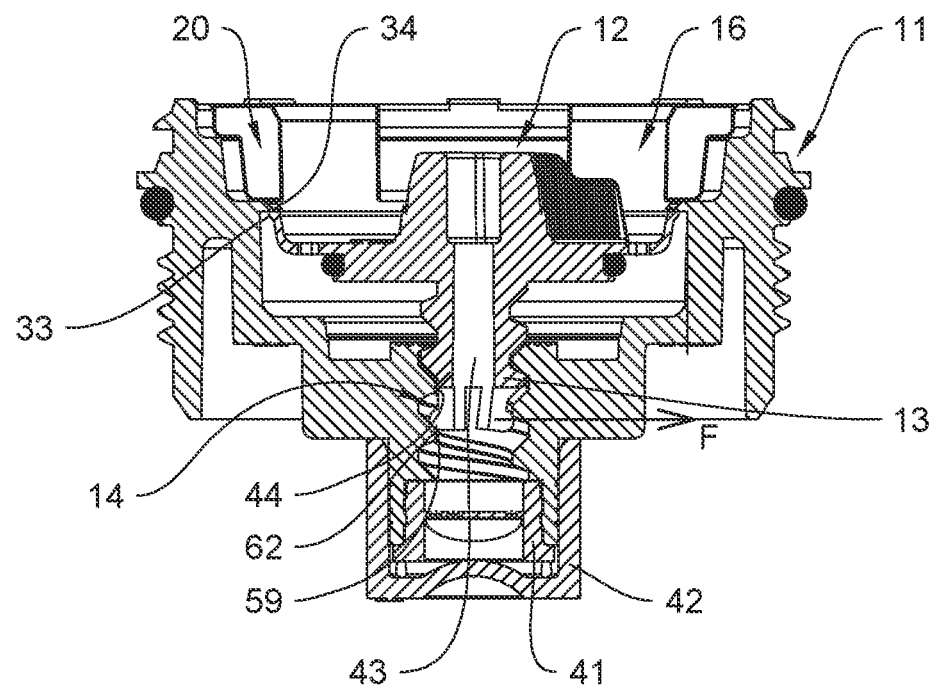
FIG. 3 shows the bung plug seal illustrated in FIG. 2 with the ventilation plug disposed in the open position.

For carrying out the fitting process and for transferring ventilation plug 12 from the closed position illustrated in FIG. 2 to the open position illustrated in FIG. 3, lid disk 29 is provided with a handling unit 35 on its upper surface, which has two gripping webs 37 in the present case, as in particular FIG. 1 shows, which are disposed opposite each other and which are separated from each other by a gap 36, gap 36 formed between gripping webs 37 being useable for a tool engagement, i.e., in particular the use of a screwdriver, in particular for facilitating the installation of ventilation plug 12 in plug depression 16.

In the embodiment of bung plug seal 10 illustrated in FIGS. 1 to 3, said bung plug seal 10 is provided with a gas exchange mechanism 38 which is independent of the function or arrangement of ventilation plug 12 in its closed position illustrated in FIG. 2 or in its open position illustrated in FIG. 3 and which serves to continuously ventilate and de-air the container interior of a bung container sealed by bung plug 11.

For forming gas exchange mechanism 38, hub 27 which is formed on depression bottom 15 and which forms receiving hole 14 is provided with a gas exchange module 40 on its lower end, said gas exchange module 40 having a membrane cartridge 41 inserted in the lower end of hub 27 and a splash guard 42 capping the lower end of hub 27. Furthermore, thread bolt 13 of ventilation plug 12 and lid disk 23 of ventilation plug 12 are provided with a continuous gas exchange hole 43 such that, irrespective of the position of ventilation plug 12, a continuous gas exchange is possible via gas exchange hole 43 and gas exchange module 40.

Figure 5:
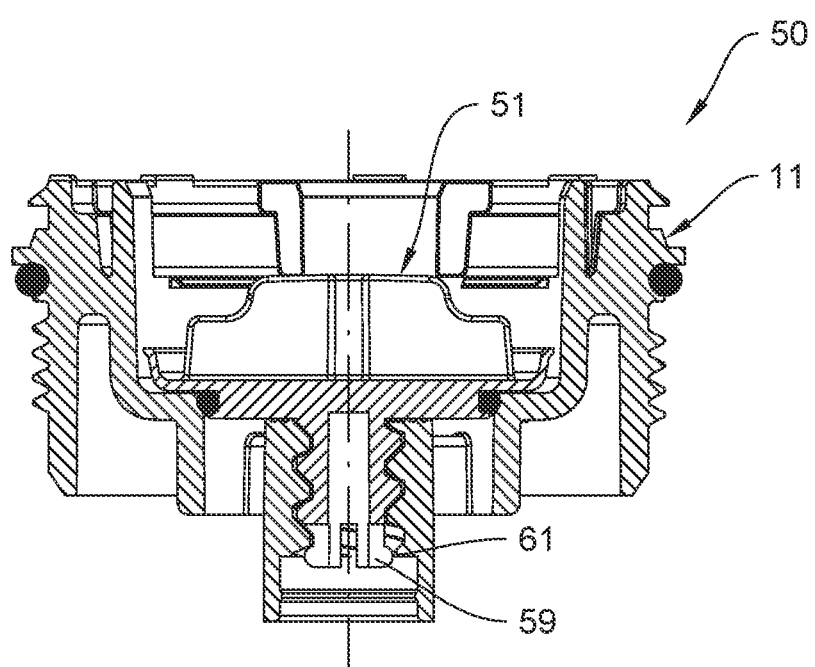
FIG. 5 is an illustration corresponding to FIG. 2 and shows an additional embodiment of a bung plug seal with a ventilation plug disposed in the closed position.
Figure 7:
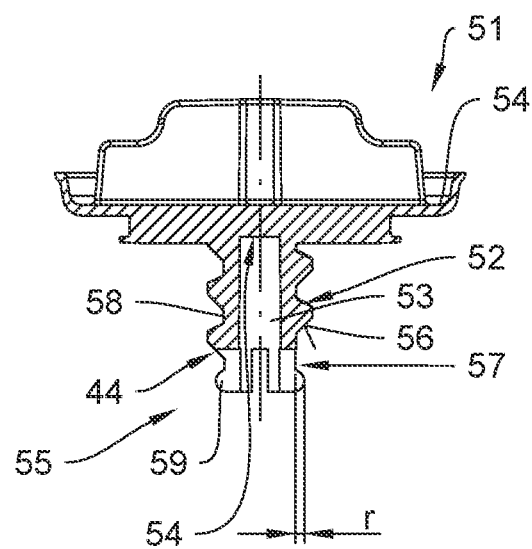
FIG. 7 is a sectional view of the ventilation plug of the embodiment of the bung plug seal illustrated in FIG. 5.

In a further embodiment, FIG. 5 shows a bung plug seal 50, which has a bung plug 11 identical to bung plug seal 10 and which, contrary to bung plug seal 10, has a ventilation plug 51 which is disposed in plug depression 16 and which, as in particular FIG. 7 shows, does not have a continuous gas exchange hole 43 but merely a blind hole 53 formed in thread bolt 52 and having a hole bottom 54 formed by a lid disk.

A direct comparison of ventilation plugs 12 and 51 illustrated in FIGS. 6 and 7, respectively, shows that the only difference in the embodiment of ventilation plugs 12 and 51 is that ventilation plug 12 is provided with gas exchange hole 43 continuously formed in ventilation plug 12, whereas ventilation plug 51 only has blind hole 53 in thread bolt 52. Correspondingly, both thread bolt 13 and thread bolt 51 form a threaded sleeve 44 because of gas exchange hole 43 and blind hole 53, respectively, threaded sleeve 44 having a spring member 55 formed at the lower end of thread bolt 13 or 52 in the illustrated embodiments.

In each case, spring member 55 is formed on a wall surface of thread bolt 13, 52, said wall surface being formed by a thread surface 56, spring member 55 having four spring tabs 57 which are evenly distributed over the circumference of thread bolt 13, 52 in the present case, said spring tabs 57 each being formed by a segment of threaded sleeve 44 and protruding a thread core 58 of thread bolt 13, 52 with a radial protrusion r, each radial protrusion r being formed by a tab head 59 which is formed on a distal end of spring tabs 57 in the present case. Spring tabs 57 formed by the segments are separated from each other by gaps 60, such that spring tabs 57 can perform radial movements independently.

As FIGS. 2, 3 and 5 show, at least one of the tab heads 59 disposed in a shared horizontal plane exerts an elastic preload force F on a thread section 61 and 62 because of the protrusion r of tab heads 59 formed over thread core 58, irrespective of the relative position of ventilation plug 12 or 51 in receiving hole 14, such that ventilation plug 12, 51 is fastened in any axial position of ventilation plug 12, 51 in receiving hole 14 because of the radial preload force irrespective of a friction force formed between external thread 28 of thread bolt 13, 52 and internal thread 39 of receiving hole 14. It is thus possible to design the thread engagement between the external thread 28 of thread bolt 13, 52 and internal thread 39 of receiving hole 14 such that the thread engagement is established as smoothly as possible.

Since a self-locking effect in the thread engagement between external thread 28 of thread bolt 13, 52 and internal thread 39 of receiving hole 14 is not necessary for fastening the axial position of ventilation plug 12, 51 in receiving hole 14 because of the advantageous effect of spring member 55, the engagement surface between external thread 28 and internal thread 27 can be minimized, i.e., external thread 28 and internal thread 39 are formed as steep as possible having a correspondingly short thread, such that the ventilation plug can be transferred from its open position to the closed position and vice versa using a minimum number of rotations.

Spring member 55 also prevents the function of ventilation plug 12, 51 from being compromised even in the case of a large amount of backlash in the thread engagement. This is in particular advantageous when the bung container provided with bung plug seal 10, 50 is subject to larger temperature fluctuations which could cause ventilation plug 11, 51 to become stuck in receiving hole 14 in the case of insufficient backlash in the thread engagement.

Figure 11:
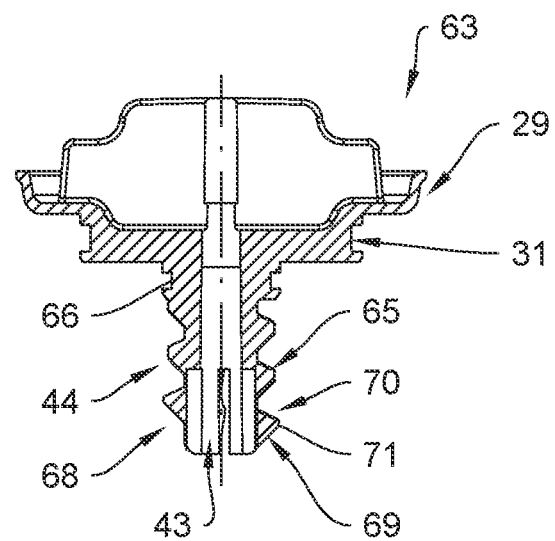
FIG. 11 is an individual illustration of the ventilation plug illustrated in FIG. 8.
Figure 12:
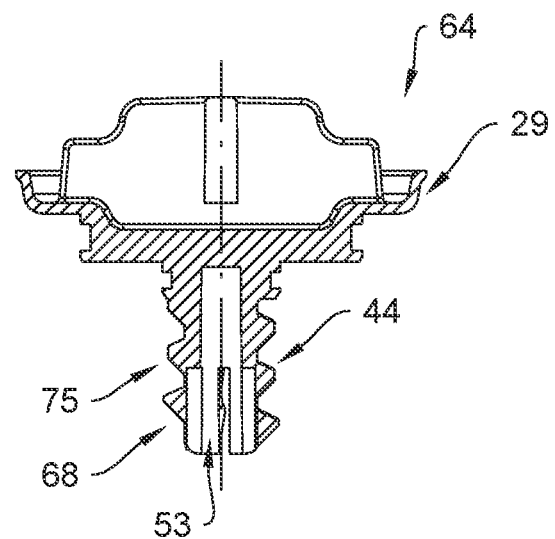
FIG. 12 is an individual illustration of the ventilation plug illustrated in FIG. 10.

Ventilation plug 63 and 64 are illustrated as further embodiments in FIGS. 11 and 12, ventilation plug 63 corresponding in its function to ventilation plug 12 illustrated in FIG. 6 and ventilation plug 64 corresponding in its function to ventilation plug 51 illustrated in FIG. 7.

Figure 8:
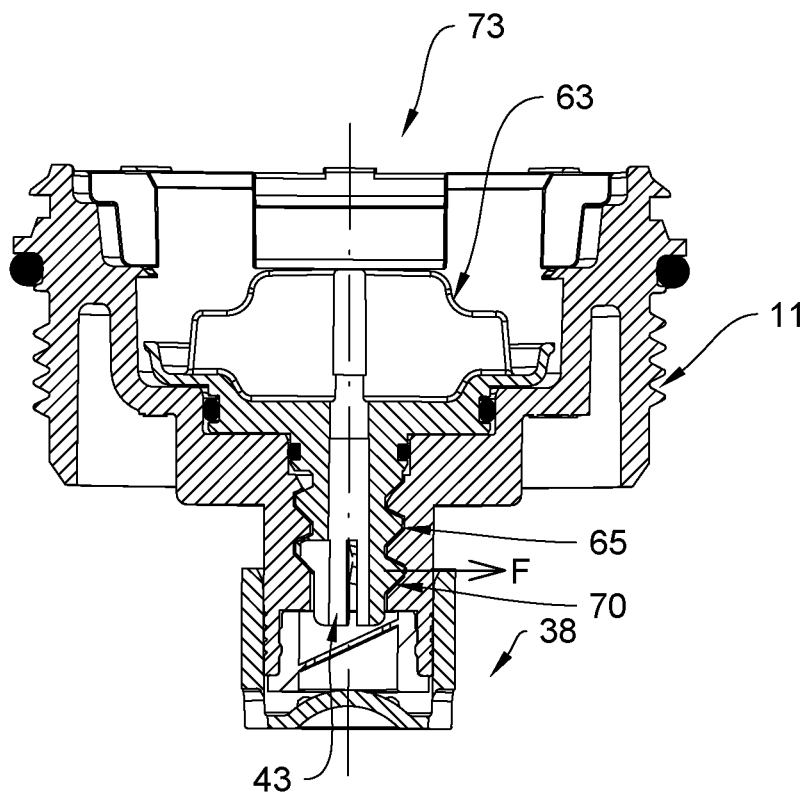
FIG. 8 is an illustration corresponding to FIG. 2 and shows a bung plug seal with an additional embodiment of a ventilation plug in the closed position.
Figure 9:
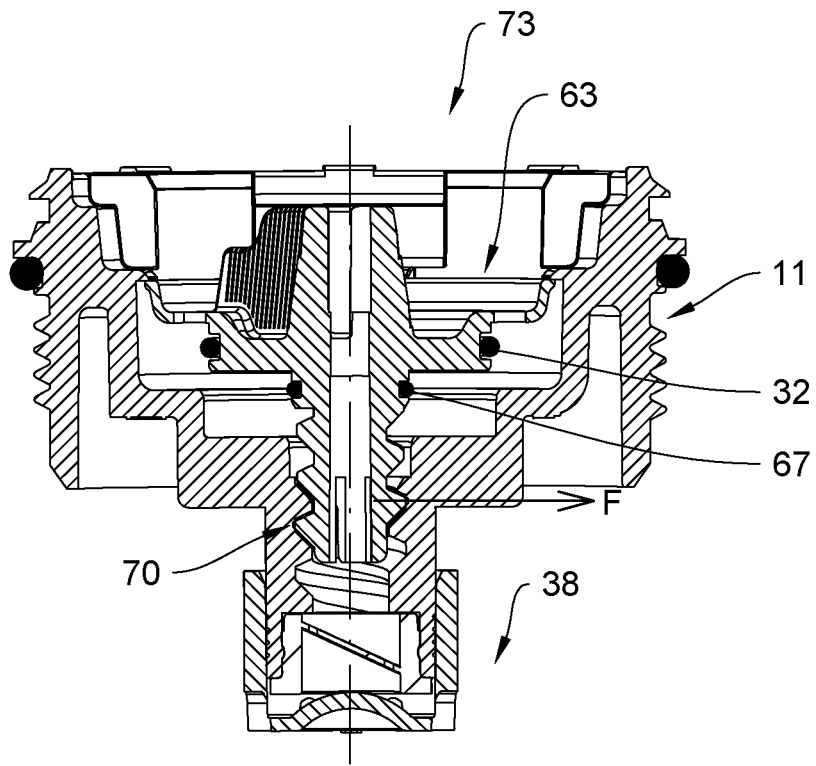
FIG. 9 shows the bung plug seal illustrated in FIG. 8 with the ventilation plug disposed in the open position.

As is illustrated in FIGS. 8 and 9, which show a bung plug seal 73, ventilation plug 63 serves to be combined with a bung plug 11 and, in accordance with ventilation plug 12, has a thread bolt 65 which is formed as a threaded sleeve 44 and provided with a continuous gas exchange hole 43. Furthermore, in accordance with ventilation plug 12, ventilation plug 63 is provided with a lid disk 29, which has a circumferential groove 31 for receiving a seal 32 on a lower surface. In addition to circumferential groove 31, an addition circumferential groove 66 is provided on the upper end of thread bolt 65 adjacent to the lower surface of lid disk 29, said circumferential groove 66 serving to receive an additional seal 67, which is formed as an O-ring in this case, as FIGS. 8 and 9 show. As is comprehensible with the aid of FIG. 8, the function of additional seal 67 is to allow for a seal between receiving hole 14 and ventilation opening 23, which is composed of opening segments 24, as in particular FIG. 4 shows.

A spring member 68 having four spring tabs 69 which are evenly distributed over the circumference of thread bolt 65 is provided on ventilation plug 63 on the lower end of thread bolt 67, said spring tabs 69 each being formed by a segment of thread bolt 65 which is formed as threaded sleeve 44, spring tabs 69, contrary to spring tabs 57 of ventilation plug 12, having a radial thread protrusion 71 which is formed on a lower thread section 70 and which is not disposed in a horizontal plane like tab heads 59 of spring member 55 of ventilation plug 12 but extends helically according to the pathway of thread section 70.

Figure 10:
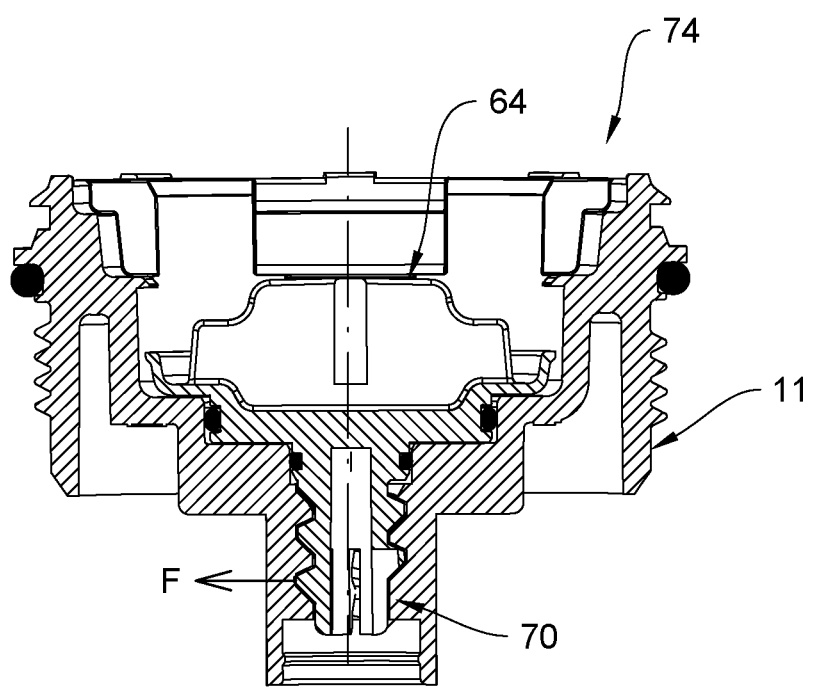
FIG. 10 is an illustration corresponding to FIG. 2 and shows a bung plug seal with an additional embodiment of a ventilation plug in the closed position.

As can be seen from FIGS. 8 to 10, an elastic preload force F acting radially is exerted by radial thread protrusion 71 in the thread engagement formed between thread bolt 65 and receiving hole 14, such that ventilation plug 63 is fastened in any axial position of ventilation plug 63 in receiving hole 14 in lower thread section 70 because of radial preload force F, irrespective of a friction force formed between an upper thread section 71 of external thread 28 of thread bolt 65 and internal thread 39 of receiving hole 14.

A direct comparison of ventilation plug 63 and 64 illustrated in FIGS. 11 and 12, respectively, shows that the only difference in the embodiment of ventilation plugs 63 and 64 is that ventilation plug 63 is provided with gas exchange hole 43 continuously formed in ventilation plug 63, whereas ventilation plug 64 only has blind hole 53 in a thread bolt 75 and thus, as illustrated in FIG. 10, serves to form a bung plug seal 74 in combination with bung plug 11, which does not have a gas exchange mechanism 38.

The invention claimed is:

1. A bung plug seal for bung containers, the bung plug seal having a bung plug for being disposed in a bung socket of the bung container, the bung plug having a plug depression for inserting a fitting tool, wherein the plug depression has a depression bottom provided with at least one ventilation opening and the bung plug is provided with a ventilation plug which is disposed in the plug depression and which has a thread bolt accommodated in an internal thread of a receiving hole formed in the depression bottom which receiving hole is formed independent from the ventilating opening and which has a lid disk provided with a handling unit and connected to the thread bolt for sealing the ventilation opening in a closed position of the ventilation plug.

2. The bung plug seal according to claim 1, wherein the thread bolt has a spring member for being supported against a wall surface of the receiving hole or the receiving hole has a spring member for being supported against a wall surface of the thread bolt, in such a manner that a preload force (F) is effective between the thread bolt and the receiving hole.

3. The bung plug seal according to claim 2, wherein the spring member is formed on a wall surface of the thread bolt or the receiving hole, said wall surface being formed by a thread surface.

4. The bung plug seal according to claim 3, wherein the spring member has at least one spring tab which is formed on the thread bolt and which has a tab head radially protruding a thread core of the thread bolt.

5. The bung plug seal according to claim 4, wherein the spring member has a plurality of spring tabs whose tab heads are disposed in a shared horizontal plane of the thread bolt.

6. The bung plug seal according to claim 5, wherein the spring tabs are disposed on a lower end of the thread bolt.

7. The bung plug seal according to claim 3, wherein the spring member is formed on a thread section of the thread bolt or of the internal thread of the receiving hole.

8. The bung plug seal according to claim 7, wherein the spring member has at least one spring tab formed on a thread section, said spring tab having a radial thread protrusion formed on the thread section.

9. The bung plug seal according to claim 1, wherein the lid disk has a locking member which interacts with a counter-locking member disposed in the plug depression, in such a manner that the axial relative movement of the lid disk in the plug depression is limited by the depression bottom on one side and by the counter-locking member on the other side.

10. The bung plug seal according to claim 9, wherein the counter-locking member has counter-locking elements which are disposed on an inner wall of the plug depression and which are formed so as to interlock with an annular locking protrusion which is formed on an engagement member of a sealing cap which is inserted into the plug depression.

11. The bung plug seal according to claim 1, wherein the bung plug has a gas exchange mechanism formed on the depression bottom for ventilating and de-airing a container interior of the bung container, the gas exchange mechanism having a gas exchange opening which is disposed in the depression bottom, the thread bolt which is disposed in the receiving hole having a passage hole which serves as a gas exchange hole for forming the gas exchange opening.

* * * * *